United States Patent
Chen et al.

(10) Patent No.: US 9,159,222 B2
(45) Date of Patent: Oct. 13, 2015

(54) METHOD AND APPARATUS FOR WIRELESS REMOTE CONTROL OF AN ELECTRIC APPLIANCE

(71) Applicant: Aengin Inc., New Taipei (TW)

(72) Inventors: Yi Hsiang Chen, New Taipei (TW); Yi Hsuan Chen, New Taipei (TW)

(73) Assignee: Aengin Inc., New Taipei (TW)

( * ) Notice: Subject to any disclaimer, the term of this patent is extended or adjusted under 35 U.S.C. 154(b) by 163 days.

(21) Appl. No.: 13/896,474

(22) Filed: May 17, 2013

(65) Prior Publication Data
US 2014/0340203 A1   Nov. 20, 2014

(51) Int. Cl.
| | |
|---|---|
| G05B 11/01 | (2006.01) |
| G08C 17/00 | (2006.01) |
| G08B 1/08 | (2006.01) |
| H04N 21/41 | (2011.01) |
| H04L 17/02 | (2006.01) |
| G08C 17/02 | (2006.01) |
| H04N 21/422 | (2011.01) |

(52) U.S. Cl.
CPC ............... *G08C 17/02* (2013.01); *G08C 17/00* (2013.01); *H04N 21/4126* (2013.01); *H04N 21/4222* (2013.01); *H04L 17/02* (2013.01)

(58) Field of Classification Search
CPC ........ G08C 17/00; G08C 17/02; G05B 11/01; H02J 9/005; H04N 21/4126; H04N 21/4222; H04N 21/42222; H04N 21/42225; H04N 21/43637; H04N 5/4403; H04N 5/63
USPC .......... 340/12.28, 12.22, 12.25, 539.3, 693.3; 370/113
See application file for complete search history.

(56) References Cited

U.S. PATENT DOCUMENTS

| | | | |
|---|---|---|---|
| 7,436,319 B1* | 10/2008 | Harris et al. | 340/12.24 |
| 7,844,353 B2* | 11/2010 | Bejean et al. | 700/83 |
| 8,319,599 B2* | 11/2012 | Aisa et al. | 340/3.1 |
| 2005/0162282 A1* | 7/2005 | Dresti et al. | 340/825.72 |
| 2006/0012488 A1* | 1/2006 | Hilbrink et al. | 340/825.69 |
| 2007/0159348 A1* | 7/2007 | Kang et al. | 340/825 |
| 2009/0323568 A1* | 12/2009 | Hoffmann et al. | 370/310 |
| 2012/0179547 A1* | 7/2012 | Besore et al. | 705/14.58 |
| 2013/0293361 A1* | 11/2013 | Posa et al. | 340/12.28 |
| 2013/0305218 A1* | 11/2013 | Hirsch et al. | 717/106 |
| 2014/0091912 A1* | 4/2014 | Lazarro et al. | 340/12.52 |
| 2014/0169795 A1* | 6/2014 | Clough | 398/106 |
| 2014/0340203 A1* | 11/2014 | Chen et al. | 340/12.25 |

* cited by examiner

*Primary Examiner* — Fekadeselassie Girma
(74) *Attorney, Agent, or Firm* — Alan D. Kamrath; Kamrath IP Lawfirm, P.A.

(57) ABSTRACT

An electric appliance remote control apparatus includes a wireless module, a memory unit, a connection unit, a controlling module, a power supply unit, and a power input end. The wireless module can receive a remote control signal and convert the remote control signal into an enabling signal. The controlling module controls ON/OFF of power from the power supply unit to the connection unit according to the enabling signal. In a method using the electric appliance remote control apparatus, the connection unit is connected to an electric appliance. Monitoring programs corresponding to the electric appliance remote control apparatus are downloaded by and installed in a handheld device and provide an operation interface on a screen of the handheld device. The remote control signal is sent to the wireless module through the operation interface of the handheld device to control or monitor the electric appliance through the electric appliance remote control apparatus.

18 Claims, 5 Drawing Sheets

METHOD AND APPARATUS FOR WIRELESS REMOTE CONTROL OF AN ELECTRIC APPLIANCE

BACKGROUND OF THE INVENTION

The present invention relates to a method and an apparatus for wireless remote control of an electric appliance and, more particularly, to a method and an apparatus for controlling power supplied to an electric appliance through a wireless transmission technique.

Use of various electric appliances becomes more frequent as a result of development of techniques. Due to reliance on the electric appliances, the plugs of many electric appliances in homes and companies are often left in the power sockets. However, these electric appliances still consume electricity even though they are not in use, and the electricity consumed by the frequently plugged electric appliances is not a low account in the total electricity consumption. Thus, the environmental protecting units keep teaching the users to unplug the electric appliances not in use to avoid unnecessary waste, yet the effect is limited. The main reason is that most users can not effectually unplug the increasing number of electric appliances in their busy lives.

Even though many electric appliances are equipped with switch timers and/or long range wireless controlling switches, the power saving effect is not as good as unplugging. In a different approach, a power switch timer is mounted between the plug of an electric appliance and a power socket to effectively cut off the power supply. However, the design for turning on/cutting off the power supply is complicated and rigid. Specifically, the user has to remove the power switch timer if it is desired to use the electric appliance while the power switch timer is in a mode cutting off the power supply or if it is desired to cut off the power supply while the power switch timer is in another mode supplying power from the power socket to the plug. Furthermore, the power switch timer can be used with only one power socket. A significant increase in the costs is inevitable if control of power supplies to many locations is required.

In a company or factory using a lot of electric appliances, controlling the power switches not only saves electricity but involves safety. As an example, the risk of wires catching fire exists, because the electric appliances still consume electricity even though they are not turned on. However, precise control of power requires professional workers and increases the costs of labor and time.

BRIEF SUMMARY OF THE INVENTION

In a first aspect of the present invention, a method for wireless remote control of an electric appliance includes providing at least one electric appliance remote control apparatus. The at least one electric appliance remote control apparatus includes a wireless module, a controlling module, a memory unit, a connection unit, a power supply unit, and a power input end. The wireless module, the controlling module, and the connection unit are electrically connected to each other. The wireless module is electrically connected to the memory unit. The wireless module is capable of receiving a remote control signal and converting the remote control signal into an enabling signal. Programs are adapted to be written into the memory unit to increase, modify, or upgrade chip program functions of the at least one electric appliance remote control apparatus. The power supply unit is electrically connected to the wireless module, the controlling module, and the connection unit. The power input end allows input of power. The power input end is connected to and supplies electricity to the power supply unit and the connection unit. The controlling module controls ON/OFF of power from the power supply unit to the connection unit according to the enabling signal. The connection unit of the at least one electric appliance remote control apparatus is connected with at least one electric appliance to be controlled. Monitoring programs corresponding to the at least one electric appliance remote control apparatus are downloaded by and installed in a handheld device. The monitoring programs are presented on a screen of the handheld device and provide an operation interface. The operation interface searches and connects with the at least one electric appliance remote control apparatus. The operation interface detects the at least one electric appliance remote control apparatus and defines the at least one electric appliance remote control apparatus as at least one specified electric appliance module. The at least one electric appliance can be controlled through operation and control of the at least one specified electric appliance module. The remote control signal is sent to the wireless module through the operation interface of the handheld device by a user to control or monitor the at least one specified electric appliance module.

In a second aspect of the present invention, an electric appliance remote control apparatus includes a wireless module capable of receiving a remote control signal and converting the remote control signal into an enabling signal. A memory unit is electrically connected to the wireless module. Programs are adapted to be written into the memory unit to increase, modify, or upgrade chip program functions of the electric appliance remote control apparatus. A connection unit is adapted to be connected to an electric appliance. A controlling module is electrically connected to the wireless module and the connection unit. A power supply unit is electrically connected to the wireless module, the controlling module, and the connection unit. The controlling module controls ON/OFF of power from the power supply unit to the connection unit according to the enabling signal.

The present invention will become clearer in light of the following detailed description of illustrative embodiments of this invention described in connection with the drawings.

DETAILED DESCRIPTION OF THE INVENTION

Figure 1:
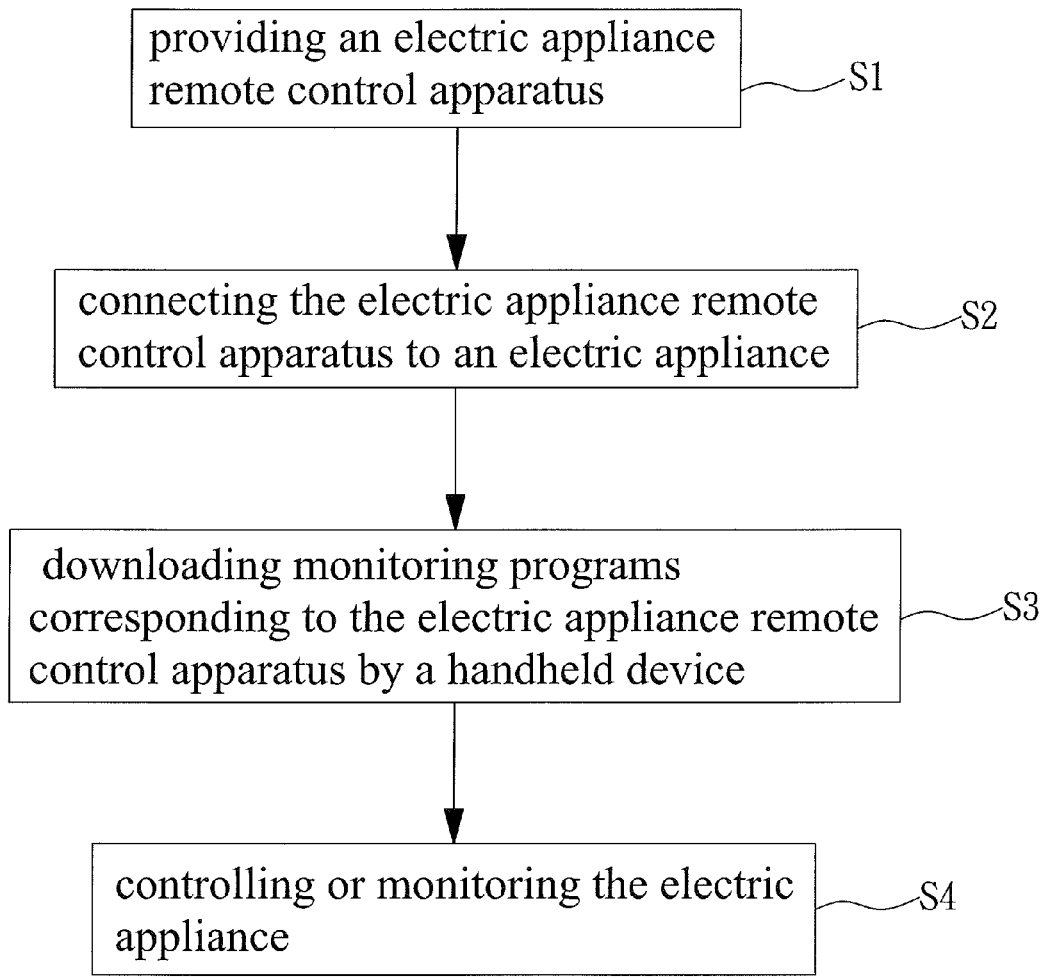
FIG. 1 is a schematic flowchart of a method of a first example according to the present invention.
Figure 2:
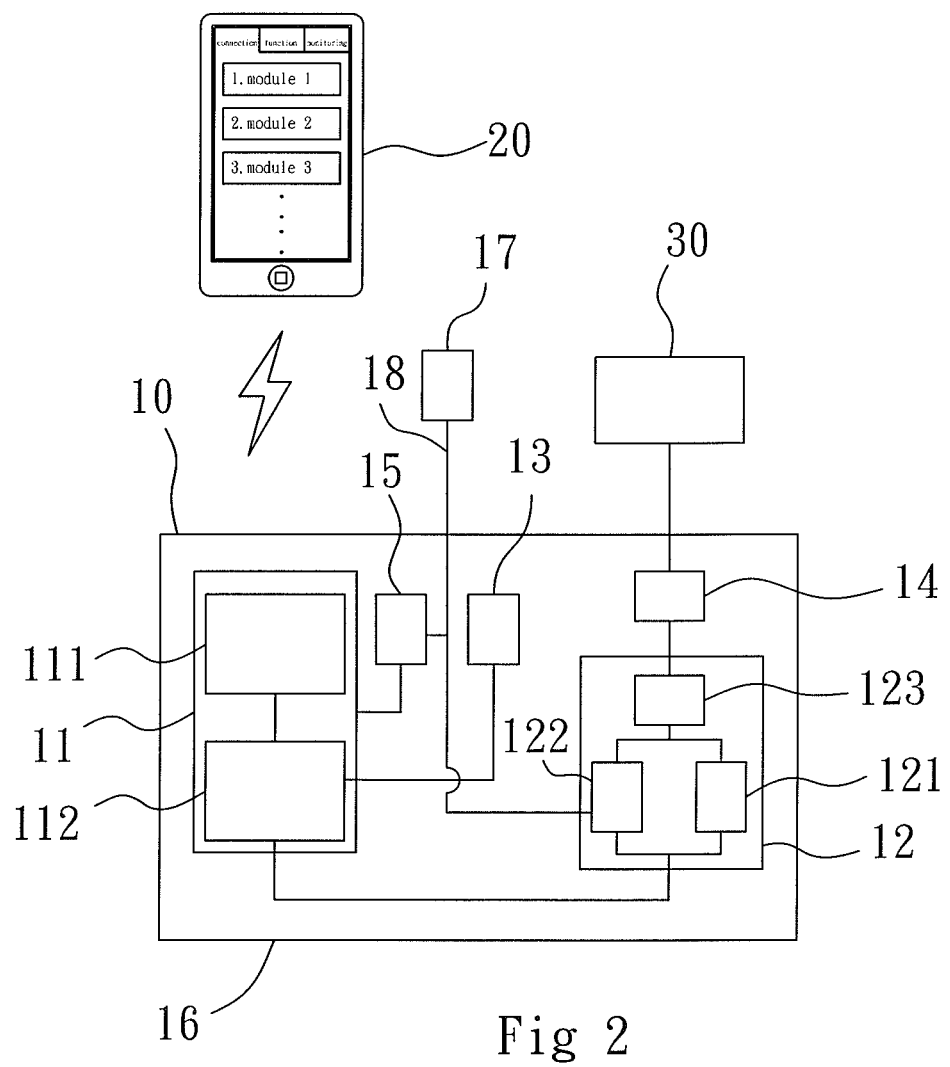
FIG. 2 is a schematic block diagram of an apparatus of a first embodiment according to the present invention.
Figure 3:
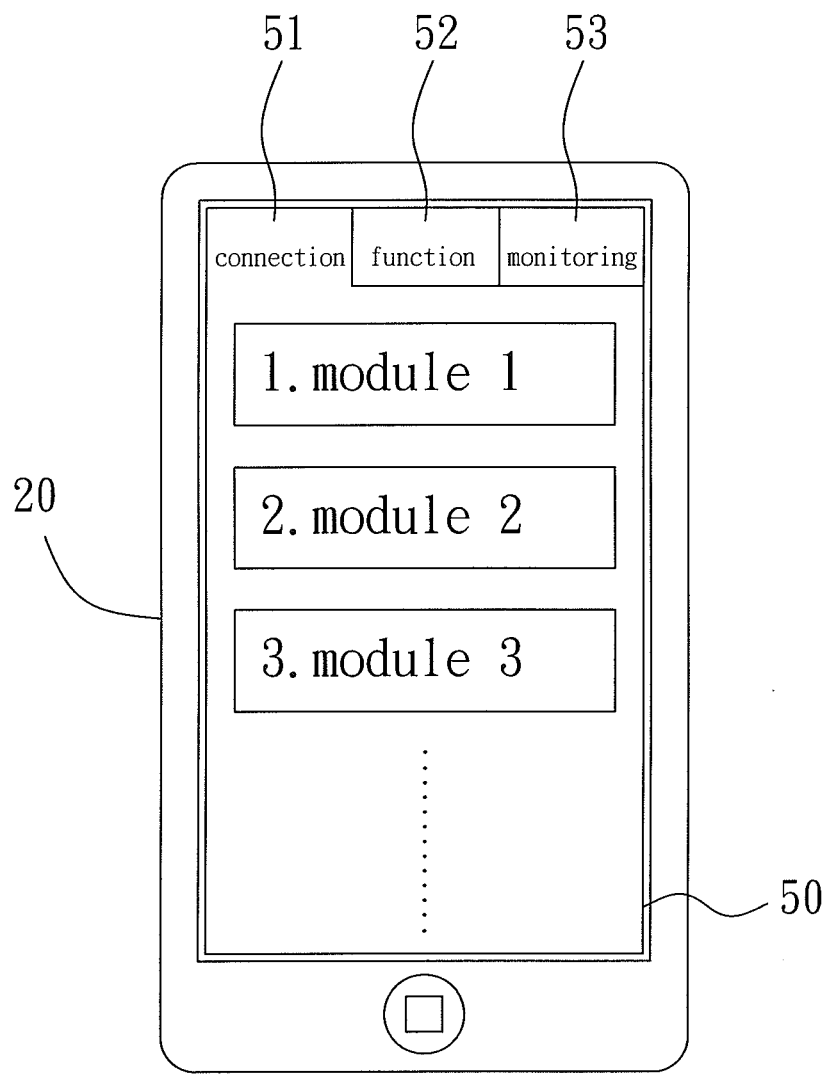
FIG. 3 is a schematic view of a handheld device according to the present invention.

FIG. 1 is a schematic flowchart of a method of a first example according to the present invention. FIG. 2 is a schematic block diagram of an apparatus of a first embodiment according to the present invention. FIG. 3 is a schematic view of a handheld device according to the present invention. The example and embodiment according to the present invention shown in FIGS. 1-3 achieve convenient control of ON/OFF of power at low costs. Specifically, in the first example shown in FIG. 1, the method for wireless remote control of an electric appliance includes providing an electric appliance remote control apparatus 10 (see step S1 in FIG. 1). The electric appliance remote control apparatus 10 includes a wireless module 11, a controlling module 12, a memory unit 13, a connection unit 14, a power supply unit 15, and a power input end 18. The wireless module 11, the controlling module 12, and the connection unit 14 are electrically connected to each other in series. The wireless module 11 is electrically connected to the memory unit 13. The wireless module 11 includes a wireless transmitting/receiving unit 111 and a microprocessing unit 112 electrically connected to the wireless transmitting/receiving unit 111. The wireless module 11 can be a Bluetooth module or WiFi (wireless fidelity). The controlling module 12 includes a monitoring unit 121, an enabling unit 122, and a protecting unit 123. Programs are adapted to be written into the memory unit 13 to increase, modify, or upgrade chip program functions of the electric appliance remote control apparatus 10.

The wireless transmitting/receiving unit 111 of the wireless module 11 can receive a remote control signal from a handheld device 20, and the microprocessing unit 112 converts the remote control signal into an enabling signal. The monitoring unit 121 of the controlling module 12 monitors power supply conditions of the electric appliance remote control apparatus 10 and generates an information signal indicative of the power supply conditions. The enabling unit 122 controls ON/OFF of power from the power supply unit 15 to the connection unit 14 according to the enabling signal. The enabling unit 122 also receives the information signal from the monitoring unit 121. The microprocessing unit 112 converts the information signal into a monitoring signal. The wireless transmitting/receiving unit 111 receives the monitoring signal and sends the monitoring signal to the handheld device 20 to provide a user with real time monitoring of the power supply conditions. The protecting unit 123 provides stable supply of electric currents and protects circuits.

The power input end 18 allows input of power. The power input end 18 is connected to and supplies electricity to the power supply unit 15 and the connection unit 14. The power supply unit 15 can be an extension cord for extended connection with a power supply seat 17 or for direct connection with the power input end 18. The power supply seat 17 and the power input end 18 are connected to and supply electricity to the power supply unit 15 and the enabling unit 122 of the controlling module 12. The power supply unit 15 is electrically connected to the wireless module 11, the controlling module 12, and the connection unit 14. In the embodiment shown in FIG. 2, the electric appliance remote control apparatus 10 includes a body 16 in a form of a housing. The wireless module 11, the controlling module 12, the connection module 14, and the power supply unit 15 are received in a space defined by the housing and isolated from the ambience. The controlling module 12 can further include a timing unit electrically connected to the enabling unit 122. The user can set the time for turning on or turning off the power source through the handheld device 20.

Next, the electric appliance remote control apparatus 10 is connected to an electric appliance 30 (see step S2 in FIG. 1). Specifically, the connection unit 14 of the electric appliance remote control apparatus 10 is connected with the electric appliance 30 to be controlled. The connection unit 14 is a power plug in this embodiment. A plug of the electric appliance 30 is inserted into the connection unit 14 to complete connection of the electric appliance remote control apparatus 10 and the electric appliance 30.

Then, monitoring programs corresponding to the electric appliance remote control apparatus 10 are downloaded by and installed in the handheld device 20 (see step S3 in FIG. 1). The monitoring programs are presented on a screen of the handheld device and provide an operation interface 50. The operation interface 50 includes a connection setting interface 51, a function switching interface 52, and a monitoring interface 53. The connection setting interface 51 searches and connects with the electric appliance remote control apparatus 10. A code can be set during the connection to prevent unauthorized access to the electric appliance remote control apparatus 10. The connection setting interface 51 includes a module switching function to allow use of a plurality of electric appliance remote control apparatuses 10. The module switching function allows the operation interface 50 to detect each electric appliance remote control apparatus 10 and define each electric appliance remote control apparatus 10 and its connection as a specified electric appliance module. After selecting or adding the specified electric appliance modules, the electric appliances connected to the specified electric appliance modules can be controlled through operation of the function switching interface 52. The function switching interface 52 provides functions of controlling ON/OFF of power, controlling an electricity transmission power, and timing. In a case that the electric appliance is an electric fan, the function switching interface 52 can control ON and OFF of the electric fan and can set the time for automatically turning the electric fan on or off. In another case that the electric appliance is a lamp, the function switching interface 52 can control ON and OFF and brightness of the lamp and can set the time for automatically turning the lamp on or off. The monitoring interface 53 monitors and checks the monitoring signal from the monitoring unit 121 to find out whether an abnormal condition occurs in the electric appliance 30, such as overloading or insufficient power. If abnormal conditions occur, the monitoring interface 53 generates an alarm, and the user can fix the problems to avoid damage. The handheld device 20 can be a cell phone, a computing device with wireless transmission functions, or a remote controller.

Next, the user sends the remote control signal to the wireless module 11 through the operation interface 50 of the handheld device 20 to control or monitor the specified electric appliance module (see step S4 in FIG. 1). Remote control of the electric appliance 30 can be achieved without troublesome operations of turning the power source on or off and of repeated unplugging and replugging. Furthermore, the user does not have to use the remote controllers of the electric appliances 30. Namely, the user can use a single handheld device 20 to simultaneously or respectively proceed with identical or different control of a plurality of electric appliances 30, allowing rapid, convenient control and selection of a plurality of specified electric modules and the electric appliances 30 connected to the specified electric modules.

Figure 4:
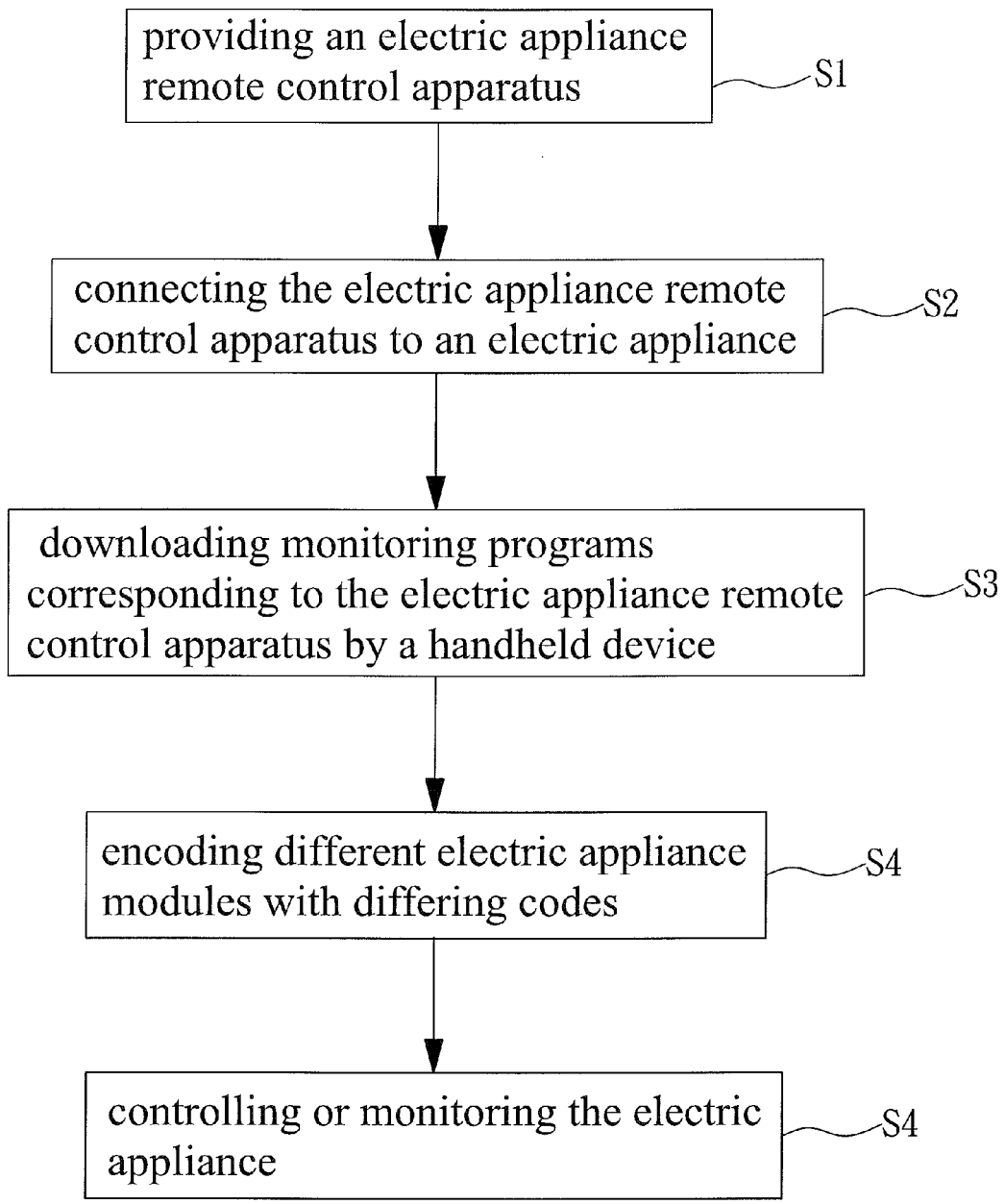
FIG. 4 is a schematic flowchart of a method of a second example according to the present invention.
Figure 5:
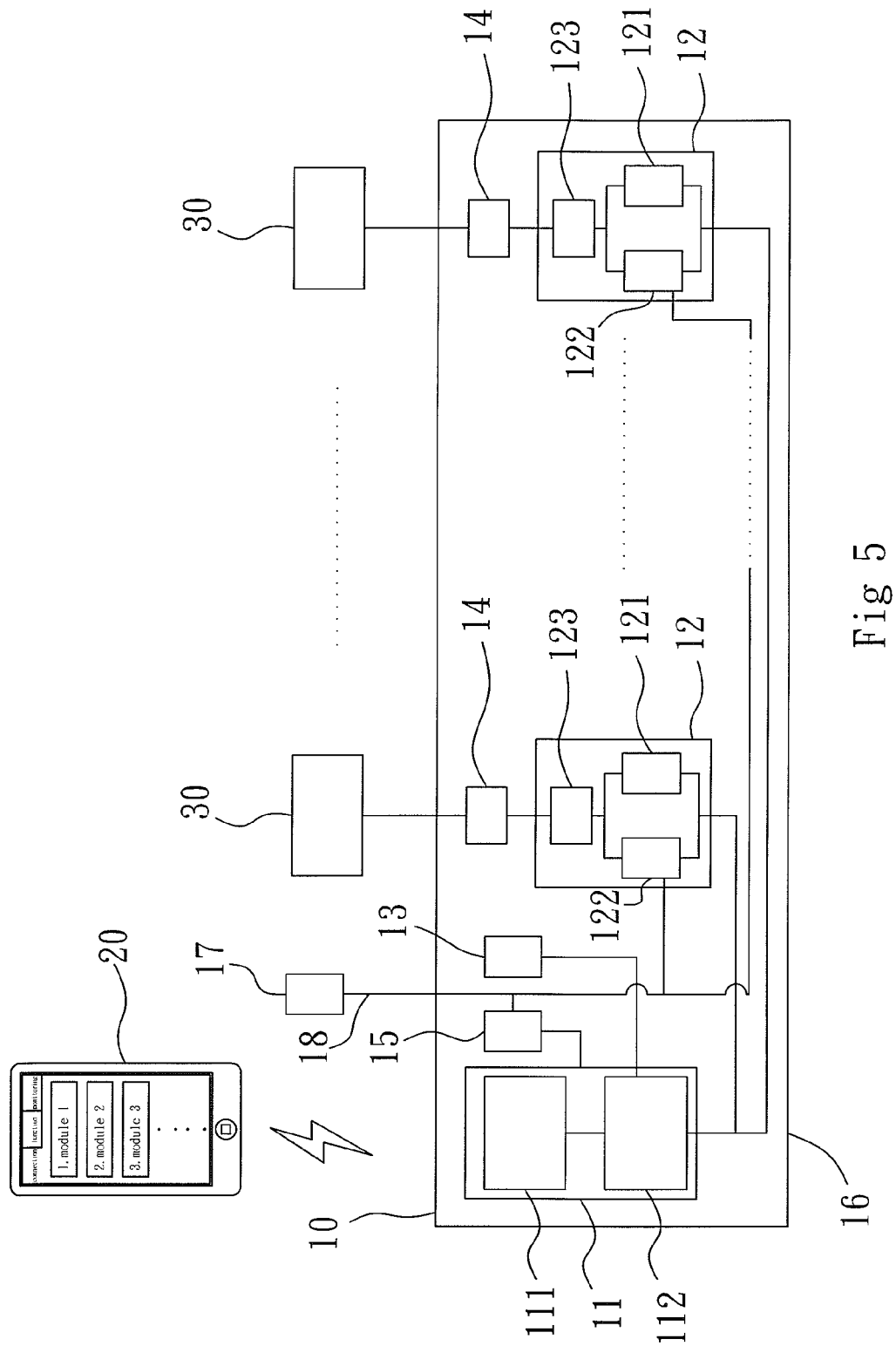
FIG. 5 is a schematic block diagram of an apparatus of a second embodiment according to the present invention.

FIG. 4 is a schematic flowchart of a method of a second example according to the present invention. FIG. 5 is a schematic block diagram of an apparatus of a second embodiment according to the present invention. Specifically, in a case that a plurality of electric appliance remote control apparatuses 10 are used (and, thus have a plurality of electric appliance modules), the electric appliance modules are encoded with differing codes after downloading the monitoring programs and before controlling or monitoring the electric appliances 30 (see step S4' in FIG. 4). This avoids confusion and erroneous control.

In view of the foregoing, the user can directly use the handheld device 20 to download the monitoring programs and controls of as many electric appliances 30 as possible, obtaining multiple module control and achieving easy, convenient control at low costs while saving energy.

Although specific embodiments have been illustrated and described, numerous modifications and variations are still possible without departing from the scope of the invention. The scope of the invention is limited by the accompanying claims.

The invention claimed is:

1. A method for wireless remote control of an electric appliance, comprising:

providing at least one electric appliance remote control apparatus, with the at least one electric appliance remote control apparatus including a wireless module, a controlling module, a memory unit, a connection unit, a power supply unit, and a power input end, with the wireless module, the controlling module, and the connection unit electrically connected to each other, with the wireless module electrically connected to the memory unit, with the wireless module receiving a remote control signal and converting the remote control signal into an enabling signal, with programs written into the memory unit to increase, modify, or upgrade chip program functions of the at least one electric appliance remote control apparatus, with the power supply unit electrically connected to the wireless module, the controlling module, and the connection unit, with the controlling module controlling ON/OFF of power from the power supply unit to the connection unit according to the enabling signal, with the power input end allowing input of power, with the power input end connected to and supplying electricity to the power supply unit and the connection unit;

connecting the connection unit of the at least one electric appliance remote control apparatus with at least one electric appliance to be controlled;

downloading and installing monitoring programs corresponding to the at least one electric appliance remote control apparatus by a handheld device, with the monitoring programs presented on a screen of the handheld device and providing an operation interface, with the operation interface searching and connecting with the at least one electric appliance remote control apparatus, with the operation interface detecting the at least one electric appliance remote control apparatus and defining the at least one electric appliance remote control apparatus as at least one specified electric appliance module, with the at least one electric appliance controllable through operation and control of the at least one specified electric appliance module; and sending the remote control signal to the wireless module through the operation interface of the handheld device by a user to control or monitor the at least one specified electric appliance module.

2. The method as claimed in claim 1, with the at least one electric appliance remote control apparatus including a body in a form of a housing, with the wireless module, the controlling module, the connection module, and the power supply unit received in a space defined by the housing and isolated from an ambience.

3. The method as claimed in claim 1, with the wireless module including a wireless transmitting/receiving unit and a microprocessing unit, with the wireless transmitting/receiving unit electrically connected to the microprocessing unit, with the wireless transmitting/receiving unit receiving the remote control signal, with the microprocessing unit converting the remote control signal into the enabling signal.

4. The method as claimed in claim 1, with the wireless module being a Bluetooth module.

5. The method as claimed in claim 3, with the controlling module including a monitoring unit, an enabling unit, and a protecting unit, with the monitoring unit monitoring power supply conditions of the at least one electric appliance remote control apparatus and generating an information signal indicative of the power supply conditions, with the enabling unit controlling ON/OFF of power from the power supply unit to the connection unit according to the enabling signal, with the enabling unit receiving the information signal from the monitoring unit, with the microprocessing unit converting the information signal into a monitoring signal, with the wireless transmitting/receiving unit receiving the monitoring signal and sending the monitoring signal to the handheld device to provide real time monitoring of the power supply conditions, with the protecting unit providing stable supply of electric currents and protecting circuits.

6. The method as claimed in claim 1, with the connection unit being a power socket.

7. The method as claimed in claim 1, with the power supply unit being an extension cord for extended connection with a power supply seat or for direct connection with a power cable.

8. The method as claimed in claim 1, with the operation interface including a connection setting interface, with the connecting setting interface searching and connecting the at least one electric appliance remote control apparatus, with the method further including setting a code during connection of the connection setting interface with the at least one electric appliance remote control apparatus, preventing unauthorized access to the at least one electric appliance remote control apparatus.

9. The method as claimed in claim 8, with the connection setting interface including a module switching function, with the at least one electric appliance including a plurality of electric appliances, with the at least one electric appliance remote control apparatus including a plurality of electric appliance remote control apparatuses, with the at least one specified electric appliance module including a plurality of specified electric appliance modules, with each of the plurality of electric appliance remote control apparatuses connected with one of the plurality of electric appliances, with each of the plurality of electric appliance remote control apparatuses including the wireless module, the controlling module, the memory unit, the connection unit, and the power supply unit, with the module switching function detecting the connection setting interface to each of the plurality of electric appliance remote control apparatuses and defining each of the plurality of electric appliance remote control apparatuses into one of the plurality of specified electric appliance modules, with each of the plurality of specified electric appliance modules controllable through operation of the operation interface to control a corresponding one of the plurality of electric appliances.

10. The method as claimed in claim 1, with the operation interface including a function switching interface, with the function switching interface providing functions of controlling ON/OFF of power, controlling an electricity transmission power, and timing of the at least one electric appliance.

11. The method as claimed in claim 1, with the operation interface including a monitoring interface, with the monitoring interface monitoring and checking the monitoring signal from the monitoring unit, with the monitoring interface generating an alarm when abnormal conditions occur.

12. The method as claimed in claim 9, further comprising: encoding the plurality of electric appliance modules with differing codes after downloading the monitoring programs and before controlling or monitoring the plurality of electric appliances.

13. The electric appliance remote control apparatus comprising:
- a wireless module receiving a remote control signal and converting the remote control signal into an enabling signal;
- a memory unit electrically connected to the wireless module, with programs written into the memory unit to increase, modify, or upgrade chip program functions;
- a connection unit adapted to be connected to an electric appliance;
- a controlling module electrically connected to the wireless module and the connection unit, with the controlling module including a monitoring unit, an enabling unit, and a protecting unit; and
- a power supply unit electrically connected to the wireless module, the controlling module, and the connection unit, with the controlling module controlling ON/OFF of power from the power supply unit to the connection unit according to the enabling signal, with the monitoring unit monitoring power supply conditions and generating an information signal indicative of the power supply conditions, with the enabling unit controlling ON/OFF of power from the power supply unit to the connection unit according to the enabling signal, with the enabling unit receiving the information signal from the monitoring unit, with the microprocessing unit converting the information signal into a monitoring signal, with the wireless transmitting/receiving unit receiving the monitoring signal and sending the monitoring signal to a handheld device to provide real time monitoring of the power supply conditions, with the protecting unit providing stable supply of electric currents and protecting circuits.

14. The electric appliance remote control apparatus as claimed in claim 13, with the wireless module including a wireless transmitting/receiving unit and a microprocessing unit, with the wireless transmitting/receiving unit electrically connected to the microprocessing unit, with the wireless transmitting/receiving unit receiving the remote control signal, with the microprocessing unit converting the remote control signal into the enabling signal.

15. The electric appliance remote control apparatus as claimed in claim 13, further comprising a body in a form of a housing, with the wireless module, the controlling module, the connection module, and the power supply unit received in a space defined by the housing and isolated from an ambience.

16. The electric appliance remote control apparatus as claimed in claim 13, with the controlling module including a timing unit electrically connected to the enabling unit.

17. The electric appliance remote control apparatus as claimed in claim 13, with the connection unit being a power socket.

18. The electric appliance remote control apparatus as claimed in claim 13, with the power supply unit being an extension cord for extended connection with a power supply seat or for direct connection with a power cable.

* * * * *